(12) United States Patent
Coughlin et al.

(10) Patent No.: US 8,620,826 B2
(45) Date of Patent: Dec. 31, 2013

(54) SYSTEM AND METHOD FOR RECEIVING REQUESTS FOR TASKS FROM UNREGISTERED DEVICES

(75) Inventors: Chesley Coughlin, Issaquah, WA (US); Isaac Oates, Seattle, WA (US); Diwakar Gupta, Seattle, WA (US); Philip Yuen, Bellevue, WA (US); Gerald Yuen, Pasadena, CA (US); Chih-Jen Huang, Kirkland, WA (US); Lee Butler, Carnation, WA (US); Howard Gefen, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 920 days.

(21) Appl. No.: 12/056,620

(22) Filed: Mar. 27, 2008

(65) Prior Publication Data

US 2009/0249459 A1 Oct. 1, 2009

(51) Int. Cl.
*G06Q 20/00* (2012.01)
(52) U.S. Cl.
USPC ............... 705/75; 705/39; 705/44; 726/7
(58) Field of Classification Search
USPC .............................. 705/75, 39, 44
See application file for complete search history.

(56) References Cited

U.S. PATENT DOCUMENTS

| | | |
|---|---|---|
| 4,674,112 A | 6/1987 | Kondraske et al. |
| 5,179,721 A | 1/1993 | Comroe et al. |
| 5,475,756 A | 12/1995 | Merritt |
| 5,613,012 A | 3/1997 | Hoffman et al. |
| 5,802,499 A | 9/1998 | Sampson et al. |
| 5,937,396 A | 8/1999 | Konya |

(Continued)

FOREIGN PATENT DOCUMENTS

| | | |
|---|---|---|
| EP | 0668580 | 8/1995 |
| GB | 2397731 | 7/2004 |

(Continued)

OTHER PUBLICATIONS

"You've Got Money: Paying via Text Message," [online]. The Wall Street Journal Online, Apr. 26, 2006, retrieved from the Internet: /URL's: http://online.wsj.com/article_print/SB114600991211335921.html [retrieved on Feb. 8, 2007].

(Continued)

*Primary Examiner* — Shewaye Gelagay
(74) *Attorney, Agent, or Firm* — Robert C. Kowert; Meyertons, Hood, Kivlin, Kowert & Goetzel, P.C.

(57) ABSTRACT

Embodiments of a system and method for receiving task requests from unregistered devices are described. Embodiments may include a communication interface service configured to receive from a communication device a message indicative of a request to perform a task. The communication interface service may determine that the communication device is not registered with an existing account that provides information for performing said task. The communication interface service may obtain identification and authentication information for an existing account via a communication channel. The existing account may be an account for that is accessible via a network-based interface. The communication channel through which the identification and authentication information is received by the communication interface service may be any communication channel that does not include the network-based interface of the existing account. Additionally, the communication interface service may use the identification and authentication information for performance of the task using the existing account.

31 Claims, 8 Drawing Sheets

(56) References Cited

U.S. PATENT DOCUMENTS

| | | |
|---|---|---|
| 5,949,044 A | 9/1999 | Walker et al. |
| 5,956,700 A | 9/1999 | Landry |
| 6,085,194 A | 7/2000 | Ige et al. |
| 6,394,907 B1 | 5/2002 | Rowe |
| 6,430,407 B1 | 8/2002 | Turtiainen |
| 6,601,057 B1 | 7/2003 | Underwood et al. |
| 6,609,113 B1 | 8/2003 | O'Leary et al. |
| 6,816,724 B1 | 11/2004 | Asikainen |
| 7,031,733 B2 | 4/2006 | Alminana et al. |
| 7,076,329 B1 | 7/2006 | Kolls |
| 7,089,208 B1 | 8/2006 | Levchin et al. |
| 7,127,264 B2 | 10/2006 | Hronek et al. |
| 7,139,694 B2 | 11/2006 | Horn et al. |
| 7,240,832 B2 | 7/2007 | Bendeck et al. |
| 7,245,902 B2 | 7/2007 | Hawkes |
| 7,251,495 B2 | 7/2007 | Keyani et al. |
| 7,500,602 B2 | 3/2009 | Gray |
| 7,636,695 B2 | 12/2009 | Driessen |
| 7,693,797 B2 | 4/2010 | Ekberg |
| 7,716,199 B2 | 5/2010 | Guha |
| 7,729,989 B1 | 6/2010 | Yuen et al. |
| 7,865,428 B2 | 1/2011 | Pegaz-Paquet et al. |
| 7,904,799 B1 | 3/2011 | Underwood et al. |
| 8,015,070 B2 | 9/2011 | Sinha et al. |
| 8,139,736 B2 | 3/2012 | Brown et al. |
| 2001/0037264 A1 | 11/2001 | Husemann et al. |
| 2002/0046353 A1 | 4/2002 | Kishimoto |
| 2002/0049644 A1 | 4/2002 | Kargman |
| 2002/0123940 A1 | 9/2002 | Spets |
| 2002/0156746 A1 | 10/2002 | Horn et al. |
| 2002/0198849 A1 | 12/2002 | Piikivi |
| 2003/0033522 A1 | 2/2003 | Bilgic et al. |
| 2003/0065615 A1 | 4/2003 | Aschir |
| 2003/0091170 A1 | 5/2003 | McCann et al. |
| 2003/0105707 A1 | 6/2003 | Audebert et al. |
| 2003/0110114 A1 | 6/2003 | Dmochowski |
| 2003/0123669 A1 | 7/2003 | Koukoulidis et al. |
| 2003/0126076 A1 | 7/2003 | Kwok et al. |
| 2003/0139174 A1 | 7/2003 | Rao |
| 2003/0144952 A1 | 7/2003 | Brown et al. |
| 2003/0166396 A1 | 9/2003 | Vermelle et al. |
| 2003/0171993 A1 | 9/2003 | Chappuis |
| 2003/0212601 A1 | 11/2003 | Silva et al. |
| 2003/0220074 A1 | 11/2003 | Wee et al. |
| 2004/0006538 A1 | 1/2004 | Steinberg et al. |
| 2004/0019564 A1 | 1/2004 | Goldthwaite et al. |
| 2004/0029569 A1 | 2/2004 | Khan et al. |
| 2004/0078340 A1 | 4/2004 | Evans |
| 2004/0081110 A1 | 4/2004 | Koskimies |
| 2004/0205026 A1* | 10/2004 | Shah et al. ............. 705/50 |
| 2004/0214597 A1 | 10/2004 | Suryanarayana et al. |
| 2004/0260603 A1 | 12/2004 | Marmotta |
| 2005/0044410 A1* | 2/2005 | Yan ................. 713/201 |
| 2005/0060250 A1 | 3/2005 | Heller et al. |
| 2005/0102230 A1 | 5/2005 | Haidar |
| 2005/0113066 A1 | 5/2005 | Hamberg |
| 2005/0120249 A1 | 6/2005 | Shuster |
| 2005/0144020 A1 | 6/2005 | Muzaffar et al. |
| 2005/0192893 A1 | 9/2005 | Keeling et al. |
| 2005/0220134 A1 | 10/2005 | Lin |
| 2005/0238149 A1 | 10/2005 | De Leon |
| 2005/0256781 A1 | 11/2005 | Sands et al. |
| 2006/0080232 A1 | 4/2006 | Epps |
| 2006/0131390 A1 | 6/2006 | Kim |
| 2006/0136334 A1 | 6/2006 | Atkinson et al. |
| 2006/0149644 A1 | 7/2006 | Sulmar et al. |
| 2006/0165060 A1 | 7/2006 | Dua |
| 2006/0206709 A1* | 9/2006 | Labrou et al. ............. 713/167 |
| 2006/0253335 A1 | 11/2006 | Keena et al. |
| 2006/0253339 A1 | 11/2006 | Singh et al. |
| 2006/0253392 A1 | 11/2006 | Davies |
| 2007/0022019 A1 | 1/2007 | Sherwin et al. |
| 2007/0027775 A1 | 2/2007 | Hwang |
| 2007/0047719 A1* | 3/2007 | Dhawan et al. ............. 379/235 |
| 2007/0049303 A1 | 3/2007 | Lee |
| 2007/0054678 A1 | 3/2007 | Doulton |
| 2007/0067398 A1 | 3/2007 | Karmarkar |
| 2007/0094135 A1 | 4/2007 | Moore et al. |
| 2007/0100651 A1 | 5/2007 | Ramer et al. |
| 2007/0106564 A1 | 5/2007 | Matotek et al. |
| 2007/0118514 A1 | 5/2007 | Mariappan |
| 2007/0192245 A1 | 8/2007 | Fisher et al. |
| 2007/0213991 A1 | 9/2007 | Bramante |
| 2007/0233615 A1 | 10/2007 | Tumminaro |
| 2007/0244811 A1 | 10/2007 | Tumminaro |
| 2007/0250920 A1* | 10/2007 | Lindsay ............. 726/7 |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2007/0257108 A1 | 11/2007 | Bellino et al. |
| 2007/0282756 A1 | 12/2007 | Dravenstott et al. |
| 2008/0003977 A1 | 1/2008 | Chakiris et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0017702 A1 | 1/2008 | Little et al. |
| 2008/0027844 A1 | 1/2008 | Little et al. |
| 2008/0040233 A1* | 2/2008 | Wildman et al. ............. 705/26 |
| 2008/0040265 A1 | 2/2008 | Rackley, III et al. |
| 2008/0052620 A1 | 2/2008 | Hwang |
| 2008/0071633 A1 | 3/2008 | Ozkan et al. |
| 2008/0109472 A1 | 5/2008 | Underwood et al. |
| 2008/0147741 A1* | 6/2008 | Gonen et al. ............. 707/104.1 |
| 2008/0177661 A1* | 7/2008 | Mehra ............. 705/44 |
| 2008/0181198 A1* | 7/2008 | Yasrebi et al. ............. 370/352 |
| 2008/0270251 A1 | 10/2008 | Coelho et al. |
| 2008/0291899 A1 | 11/2008 | Gromoll et al. |
| 2009/0070263 A1 | 3/2009 | Davis et al. |
| 2009/0081989 A1 | 3/2009 | Wuhrer |
| 2009/0106138 A1* | 4/2009 | Smith et al. ............. 705/35 |
| 2009/0119190 A1 | 5/2009 | Realini |
| 2009/0132392 A1 | 5/2009 | Davis et al. |
| 2009/0287601 A1 | 11/2009 | Tumminaro et al. |
| 2010/0016002 A1 | 1/2010 | Konicek et al. |
| 2010/0041366 A1 | 2/2010 | Zackrisson |
| 2010/0130164 A1 | 5/2010 | Chowdhury et al. |
| 2010/0145835 A1 | 6/2010 | Davis et al. |
| 2011/0069657 A1 | 3/2011 | Gholmieh et al. |

FOREIGN PATENT DOCUMENTS

| | | |
|---|---|---|
| JP | 2002-207934 | 7/2002 |
| KR | 2002-0045082 | 6/2002 |
| KR | 2005-0007986 | 1/2005 |
| KR | 2005-0120890 | 12/2005 |
| KR | 2005-0122935 | 12/2005 |
| KR | 2006-0106328 | 10/2006 |
| KR | 2006-0114776 | 11/2006 |
| WO | 01/17310 | 3/2001 |
| WO | 03-005270 | 1/2003 |

OTHER PUBLICATIONS

"Mobile Pavment—Product and Service Description", downloaded from http://www.mobileweb.be/en/sms-payment.asp on Oct. 24, 1007, 3pages.

"Anam introduces SMS payments", downloaded from http://www.theregisterco.uk/2007/06/hash_cash_sms payments/print.html on Oct. 24, 2007, 2 pages.

"Make mobile content delivery and billing cost effective, simple and fast with mSERV!", downloaded from http://mbill.biz/solutions/mserv/?gclid=CMHBhMasgl8DFRUHWAod62K8Sg on Oct. 24, 2007, 2 pages.

"All about texting, SMS and MMS", downloaded from http://www.textually.org/textuallv/archives/cat_sms_and_micro_payments.htm on Oct. 24, 2007, 10 pages.

(56) References Cited

OTHER PUBLICATIONS

"PayPal to rival TextPayMe for SMS payments?"downloaded from http://www.engadget.com/2006/02/03/paypal-to-rival-textpayme-for-sms-payments on Oct. 24, 2007, 11 pages.
PayPal to launch SMS payments service, downloaded from http://www.finextra.com/fullstory.asp?id=15091 on Oct. 24, 2007, 2 pages.
"US Caches on with SMS Payments"downloaded from http://yugatech.com/blog/the-intrnet/us-catches-on-with-sms-payments on Dec. 24, 2007, 8 pages.
"SMS Payment", downloaded from http://www.moldcell.md/eng. Services/Payments./SMSpayment on Oct. 24, 2007, 2 pages.
"Welcome to Sepomo Micropayments", downloaded from http://www.sepomo.com/en/welcom.php on Oct. 24, 2007, 4 pages.
"Secure SMS Payment Solutions", downloaded from http:/www,eko.com.au/?Solutions/Payment on Oct. 24, 2007, 2 pages.
"Why is SMS Marketing more effective than traditional methods?", downloaded from http://www.market-to-cell.com/?ppc_id=l05432&type=GoopleAdwordsSearch&ppc_kw on Oct. 24, 2007, 4 pages.
"SMS/mobile micro payments—how to?", downloaded from http://quomon.com/questions_SMS_mobile_micro_payments-to_l93.aspx on Oct. 24, 2007. 3 pages.
"Mobile Payment: A Journey Through Existing Procedures and Standardization Initiatives", by Karnouskos et al., for IEEE Communications Surveys, The Electronic magazine of Original Peer-Reviewed Survey Articles, Fourth Quarter 2004, vol. 6, No. 4, pp. 44-66.
"What is TextPayMe?" [online] TextPayMe 2005-2006 [retrieved on Nov. 6, 2006]. Retrieved from the Internet: <URL: www.textpayme.com/us/secure/index.tpm>, 1 page.
"PayPal Goes Mobile" [online]. PayPal, 1999-2006, [retrieved on Nov. 6, 2006]. Retrieved from the Internet: <URL's: www.paypal.com/cgi-bin/webscr?cmd=xpt/cps/mobile/MobileOverview-outside; www.paypal.com/cgi-bin/webscr?cmd=xpt/mobileobeSend-outside; www.paypal.com/cgi-bin/webscr?cmd=xpt/cps/mobile/MobileT2B-outside ;www.paypal.com/cgi-bin/webscr?cmd=xpt/cps/mobile/Text2Give-outside; www.paypal.com/cgi-bin/webscr?cmd=xpt/cps/mobile/MobileFAQ-outside; www.shareholder.com/paypal/releaseDetail.cfm?ReleaseID=192226&Category=US>, pp. 1-14.
"SMS Payment" [online]. Moldcell, 2006, [retrieved on Nov. 6, 2006], Retrieved from the Internet: <URL: www.moldcell.md/eng/Services/Payments/SMSpayment>, 2 pages.
"Atlas Telecom Mobile launches an international text message based payment solution for Internet content" [online]. SMS Kambi, 2003, [retrieved on Nov. 6, 2006]. Retrieved from the Internet: URL:www.smskambi.com/en/press/2003-03-13.jsp>, 1 page.
Atlas Telecom Mobile will offer its payment solution via mobile phone to Tadaa Wireless WiFi clientele [online]. SMS Kambi, 2003, [retrieved on Nov. 6, 2006]. Retrieved from the Internet: <URL: www.smskambi.com/en/press/2003-07-17.jsp>, 1 page.
"Frequently Asked Questions: Answers to all questions about SMS Kambi" [online]. SMS Kambi, 2003, [retrieved on Nov. 6, 2006]. Retrieved from the Internet: <URL: www.smskambi.com/en/faq.jsp>, 5 pages.
"TextPayMe Tour" [online]. TextPayMe, 2005-2006, [retrieved on Nov. 6, 2006]. Retrieved from the Internet: <URL's: www.textpayme.com/us/tour/tour1.tpm; www.textpayme.com/us/tour/tour2.tpm; www.textpayme.com/us/tour/tour3.tpm; www.textpayme.com/us/tour/tour4.tpm; www.textpayme.com/us/secure/registertpm>, 6 pages.
"Paypal to offer SMS payment" [online] Iol,2006 [retrieved on Nov. 6, 2006] Retreved from the Intrnet:<URL: www.iol.co.za/index.php?set_id=115&art_id=iol1143117411111P140>, 2 pages.
"MobileLime makes shopping more rewarding" [online]. MobileLine, 2006, [retrieved on Nov. 6, 2006]. Retrieved from the Internet: <URL: www.mobilelime.com/mobilelime/home.do?action=index; www.mobilelime.com/mobilelime/home.do?action=consumersl; www.mobilelime,com/mobilelime/home.do?action=earnrewards; www.mobilelime.com/mobilelime/home.do?action=makepurchases; www.mobilelime.com/mobilelime/home.do?action=doitall; www.mobilelime.com/mobilelime/home.do?action=whouses; www.mobilelime.com/mobilelimehome.do?action=pressreleasedetails&contentid=209, pp. 1-10.
"Obopay" [online]. Obopay, 2006, [retrieved on Nov. 6, 2006]. Retrieved from the Internet: <URL: https://www.obopay.com/consumer/; www.obopay.eom/consumer/GetHelp.do;jsessionid=F1ndf7KYsThCHJ2HZ2HzICk472Y1cL6mXbzGyZFyGJvLt2RDjbLz!-468797365?target=LeamMorePage; www.obopay.com/consumer/GetHelp.do?target=HelpTextMessagingPage; www.obopay.com/consumer/GetHelp.do?target=HelpHowWorks>, 8pages.
"BillMonk" [online]. BillMonk, 2006, [retrieved on Nov. 6, 2006]. Retrieved from the Internet: <URL: www.billmonk.com/; www.billmonk.com/about/faq; www.billmonk.com/about/sms; https://www.billmonk.com/images/screenshot_sms_shared_flow.png>, 15 pages.
U.S. Appl. No. 12/056,608, filed Mar. 27, 2008.
U.S. Appl. No. 12/057,148, filed Mar. 27, 2008.
U.S. Appl. No. 11/858,001, filed Sep. 19, 2007.
U.S. Appl. No. 11/546,534, filed Oct. 10, 2006.
U.S. Appl. No. 11/546,030, filed Oct. 10, 2006.
U.S. Appl. No. 11/611,716, filed Dec. 15, 2006.
U.S. Appl. No. 11/858,006, filed Sep. 19, 2007.
U.S. Appl. No. 11/858,002, filed Sep. 19, 2007.
International Search Report and Written Opinion from PCT.US2009/036840 mailed Oct. 23, 2009.
Layton, J., "How ebay Works," How Stuff Works website. Dec. 3, 2005, All pages.

* cited by examiner

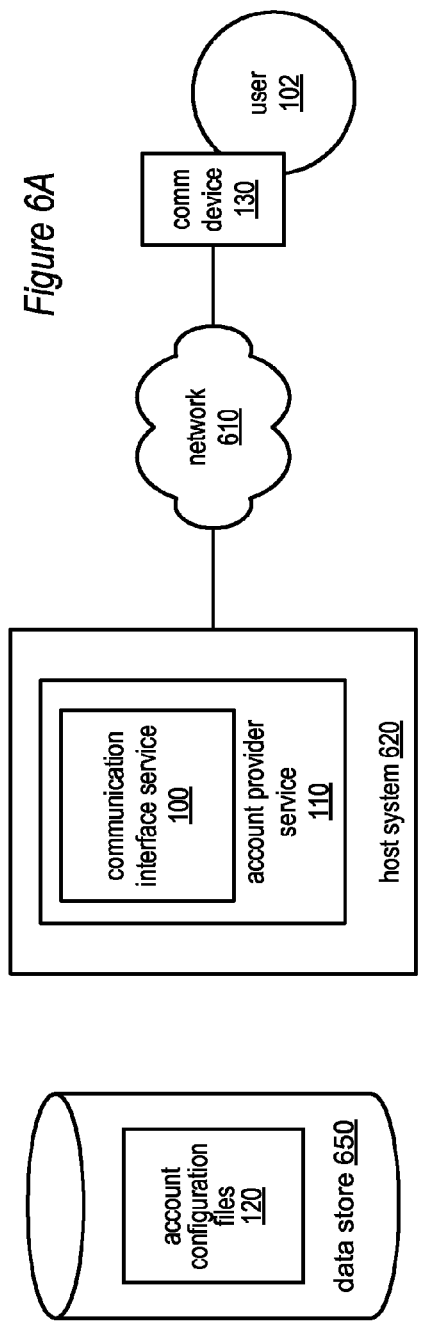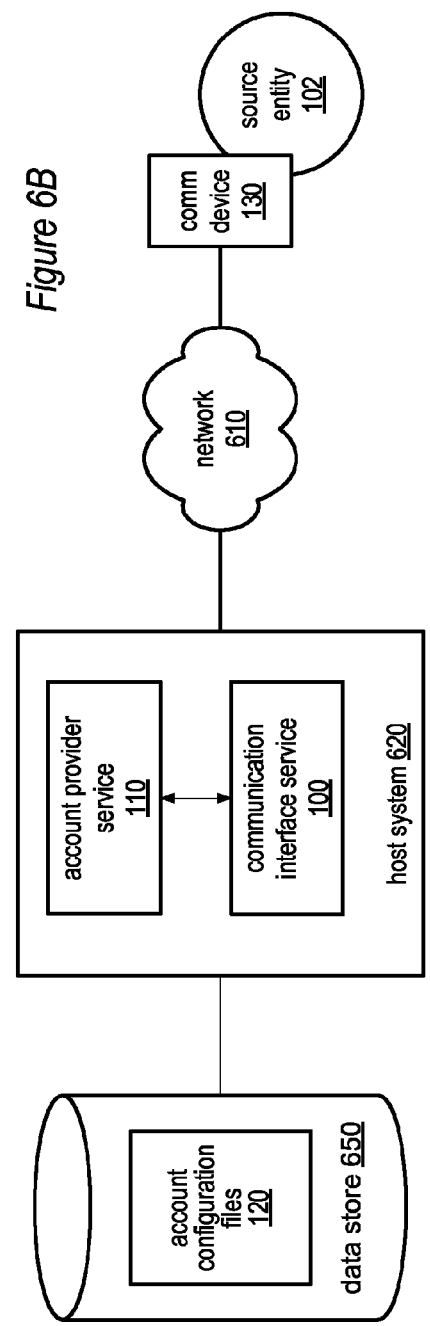

SYSTEM AND METHOD FOR RECEIVING REQUESTS FOR TASKS FROM UNREGISTERED DEVICES

BACKGROUND

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Mobile telephony has emerged alongside the Internet and the web, and the two technologies have crossed over and merged to form what is essentially a global communications and information network. Cellular telephones, for example, have become "digital", and continue to become more sophisticated. Today, many digital cell phones are capable of web access via their cellular service providers. Similarly, many web applications are capable of telephone communications to conventional phones and to mobile telephones. In addition, other technologies such as text messaging have emerged to enhance the capabilities and uses of mobile telephones and other personal electronic devices. Further, other personal electronic devices, such as Personal Digital Assistants (PDAs) may provide mobile telephone links to the web, and user interfaces for accessing the web, along with text messaging and other information and communications capabilities. Thus, these devices are part of the emerging global communications and information network. SMS (Short Message Service) is a service for sending messages of up to 160 characters (224 characters if using a 5-bit mode) to mobile phones. SMS does not require the mobile phone to be active and within range. An SMS message may be held until the target phone is active and within range. SMS messages may be transmitted within the same cell, or out of the cell to phones with roaming service capability. SMS messages may also be sent to digital phones from a web site, or from one digital phone to another. An SMS gateway is a web site that accepts SMS messages for transmission to cell phones within the cell served by that gateway, or that acts as an international gateway for users with roaming capability.

Various applications of the Internet, and of the web, involve marketplaces that provide goods and services for sale. For instance, consumers may visit a merchant's website to view goods and services offered for sale. With the merging of mobile telephony and other technologies and the web into an emerging global communications and information network, these other technologies have become part of such marketplaces in many such applications.

BRIEF DESCRIPTION OF THE DRAWINGS

FIGS. 6A-6D illustrate block diagrams of various system configurations for systems including a communication interface service, according to various embodiments.

Figure 1A:
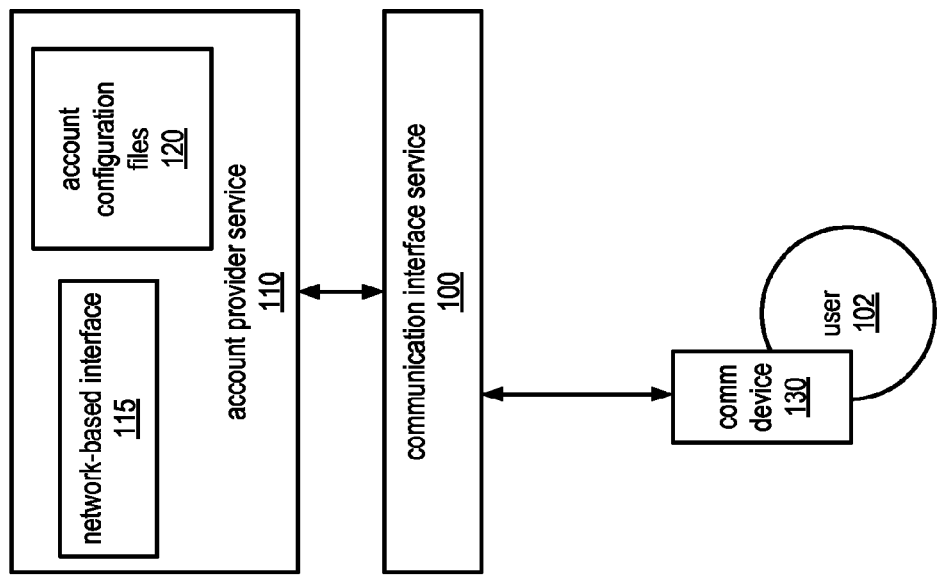
FIGS. 1A-1B illustrate block diagrams of an account provider service including a communication interface service, according to various embodiments.

While the system and method for receiving task requests from unregistered devices is described herein by way of example for several embodiments and illustrative drawings, those skilled in the art will recognize that the system and method for receiving task requests from unregistered devices is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for receiving task requests from unregistered devices as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for receiving task requests from unregistered devices are described. The system and method for receiving task requests from unregistered devices may a communication interface service configured to receive a message from a communication device. Such message may indicate a request to perform a task. For example, such message may be a text message including a promotional code for purchasing items or services. The communication interface service may be configured to determine that the communication device is not registered with an existing account that provides information for performing said task. For instance, the communication service might search various account records for an identifier associated with the communication device. In this example, if no identifier for the communication device is found, the communication interface service may determine that the communication device is unregistered. The communication interface service may be configured to obtain identification and authentication information for an existing account via a communication channel. For instance, the communication interface service may be configured to obtain such information via a voice communication channel by utilizing an automated voice system. The existing account may be an account for that is accessible via a network-based interface. For example, the existing account may be an account provided by a web-based merchant that receives and processes orders for goods and services via the Internet. The communication channel through which the identification and authentication information is received by the communication interface service may be any communication channel that does not include the network-based interface of the existing account. Additionally, the communication interface service may be configured to use the account identification and authentication information for performance of the task using the existing account.

The account provider service and the communication interface service described herein may in various embodiments supports communications via various communication channels. Communication channels may include any methods or mechanisms for transmitting information between entities. Communication channels generally include protocols for information transfer (e.g., Short Message Service (SMS) for text messaging), media over or through which information is transmitted according to the protocols, and infrastructures for supporting the transmissions (e.g., cellular telephone service providers). Further, a communication channel may require various devices that enable entities to communicate via the communication channel, for example a mobile phone, satellite phone, cell phone, conventional telephone, computer system, or Personal Digital Assistant (PDA). Examples of communication channels include, but are not limited to, conventional, land-based telephone systems, mobile or cellular telephone systems, satellite telephone systems, email, instant messaging (IM), Voice over IP (VoIP), and text messaging. Note that separate communication channels may share one or more of protocol, media, infrastructure, and enabling device. For example, text messaging and cellular telephone systems may be enabled through the same device (a cell phone) and may transmit over the same medium.

Note that communications on communication channels over which voice messages may be transmitted (e.g., conventional, land-based telephone systems, mobile or cellular telephone systems, satellite telephone systems, VoIP, etc.) may collectively be referred to herein as "voice communications", and likewise the channels may be referred to collectively as "voice communication channels". Further note that voice communications includes both "live" or real human voice communications and automated voice systems. Automated voice systems include automated systems in which synthesized or recorded voice messages are transmitted to communicate information. Note that some automated voice systems may transmit at least some synthesized or recorded voice messages in response to vocal input (via voice recognition technology) or other input into a communication device (e.g., numeric key pad entries).

In some embodiments, a communication channel may include a network-based interface configured to support communications between a network-based entity (e.g., an online service or a web server supporting such service) and one or more other entities (e.g., users accessing such a service via the Internet or another network). In various embodiments, a network-based interface may be a web-based interface configured for communications via the Internet or World Wide Web. For instance, in one embodiment, such a network-based interface may be configured to provide a user with one or more web pages for accessing various functions, such as functions of the entity in which the network-based interface is implemented. For example, if a network-based interface were implemented as part of an online merchant's website, the network-based interface may provide one or more product web pages enabling users to purchase one or more items via the Internet. In many embodiments, access to such a network-based interface may include the use of a personal computer equipped with a web browser, such as Internet Explorer, Mozilla Firefox, or Opera.

FIG. 1A illustrates an account provider service (e.g., account provider service 110) configured to communicate with a communication interface service (e.g., communication interface service 100). Account provider service 110 may in various embodiments include a variety of services configured to provide and/or manage user accounts. For each user account provided, the account provider service may be configured to perform one or more tasks. For instance, in one embodiment, the account provider service may be a merchant service configured to enable one or more users (e.g., user 102) to purchase items. For instance, such a merchant service may receive a purchase request (e.g., from user 102) and perform the task of processing the purchase request by initiating a fulfillment process (e.g., packaging and shipping) for one or more purchased items.

As demonstrated by the illustrated embodiment, account provider service 110 may include a network-based interface (e.g., network-based interface 115). Network-based interface 115 may in various embodiments enable a user (e.g., user 102) to register for an account with the account provider service. For instance, the network-based interface may present one or more registration web pages to the user. For example, such registration web pages may include one or more fields in which the user may specify details relevant to the account (e.g., the user's name, contact information, shipping and/or billing address, billing methods, account numbers including credit card numbers, etc.). As illustrated by account configuration files 120, the account provider service may be configured to establish an account for user, such as by generating an account configuration file that stores such registration information as well as other relevant account details. For instance, in some embodiments, the account provider service may enable the user to purchase one or more items. Accordingly, the account configuration files may include information pertaining to such purchases (e.g., invoices, order status, shipment and/or tracking information, etc.).

During such registration process, the user may in some cases register identification and authentication information with the account provider service. For example, such identification information may include a username, user ID or email address or some other type of identification information. In some embodiments, the username may be a user-selected alias, such as an email address, or an alias assigned by the communication interface service. Additionally, such authentication information may include a password, passcode, security code, security image, or some other type of authentication information. For instance, in one embodiment, such identification and authentication information may include an electronic mail ("email") address and a user-defined password including a string of characters, numbers and/or symbols. For a particular user, the identification and authentication information described herein (or some representation thereof, e.g., a one-way function result of such identification and/or authentication information) may be stored in the user's account configuration file for subsequent account access. For example, when a user accesses network-based interface 115, the network-based interface may prompt the user for one or more portions of the above described identification and authentication information. Accordingly, the user may provide such information (e.g., via one or more fields of a login webpage). The network-based interface may be configured to determine whether the provided identification and authentication information is correct with respect to identification and authentication information stored in the user's account configuration file. If the user's identification and authentication information is correct (with respect to the stored identification and authentication information), the account provider service may enable the user to access one or more functions of their account. For instance, the user may be enabled to purchase items or services or transfer funds to various entities.

In various embodiments, other types of account provider services and account functions are possible and contemplated. For instance, in one embodiment, account provider service may include accounts that include account functions for managing one or more accounts including but not limited to cellular telephone accounts, cable or satellite television accounts, subscription-based accounts (e.g., newspaper, magazine, movie, music, etc.), bank accounts (e.g., checking, savings, etc.), investment accounts, credit accounts (e.g., credit cards, student loans, etc.). In general, account provider service may be any type of service configured to provide user accounts as well as perform tasks associated with the account (e.g., initiating or confirming a purchase, checking a balance, transferring funds, or performing another one of the various tasks described herein).

Figure 1B:
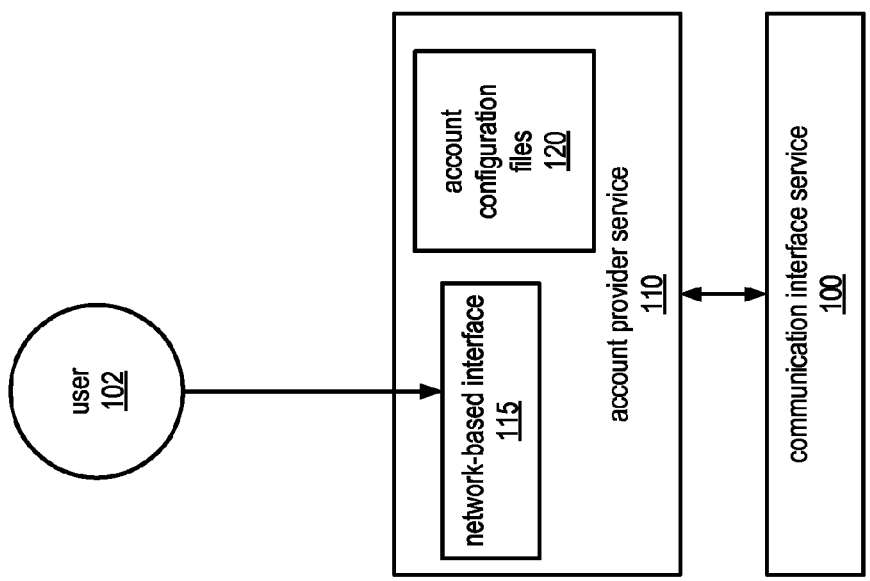

As illustrated by FIG. 1B, communication interface service 100 may be configured to provide a user or account holder (e.g., user 102) with access to one or more accounts provided by account provider service 110. In various embodiments, such user (e.g., user 102) may be a user that has previously established an account with account provider service 110, such as by the registration techniques described above. In embodiments, communication interface service 100 may be configured to enable user 102 to access various functions of their account via a communication device (e.g., communication device 130) that is not registered with the account provider service. For instance, in one embodiment, the account provider service may have no record of communication device 130 (or an identifier thereof) within account configuration files 120 or any other records accessible to the account provider service.

As described above, communication interface service 100 may be configured to enable a user to request the performance of one or more tasks to be performed (or initiated by) account provider service 110. In various embodiments, performing such tasks may include utilizing information previously submitted via network-based interface 115 (e.g., account preferences, shipping preferences, billing preferences). For instance, if providing such a function includes enabling the user to purchase an item, the communication interface service and/or the account provider service may access a billing preference and bill the user for the item according to the billing preference. For instance, the billing preference may specify a particular credit card to be used to pay for items purchased via the account.

In various embodiments, communication device 130 may be a cellular telephone, smart phone, personal digital assistant (PDA) or other device configured to communicate with the communication interface service via one or more cellular technologies including but not limited to Global System for Mobile Communications (GSM), General Packet Radio Service (GPRS), Code Division Multiple Access (CDMA), Time Division Multiple Access (TDMA), Evolution-Data Optimized (EV-DO), Enhanced Data Rates for GSM Evolution (EDGE), Universal Mobile Telecommunications System (UMTS), and/or other cellular technologies, whether such technologies are presently known or developed in the future.

In various embodiments, communication device 130 may be a device configured to communicate with communication interface service 100 via a text messaging communication channel. For instance, the communication device 130 may be configured to transmit text messages to, receive text messages from, and/or exchange text messages with communication interface service 100. In various embodiments, such text messaging communications may adhere to one or more text messaging protocols including but not limited to SMS or other text messaging protocols, whether such other text messaging protocols are presently known or developed in the future.

Consider the following example. As described above, user 102 may be a user that has previously established a user account with account provider service 110 via network-based interface 115 (e.g., via the registration techniques described above). In this example, user 102 may view/hear an advertisement, such as a television commercial, roadside billboard, print advertisement, radio commercial, or some other advertisement. Such advertisement may include instructions for ordering an item via a communication channel other than a network-based interface. For example, such advertisement might include the following exemplary message: "To purchase this item, text <message> to <account provider service>," where <message> represents a word, code, or phrase and <account provider service> represents an identifier for an account provider service, such as a telephone number to which text messages may be sent. Subsequent to viewing such advertisement, the user may decide to purchase the described item by sending the appropriate text message to the appropriate account provider service identifier.

Accordingly, in this example, communication interface service 100 may receive such text message and process the purchase request for the item despite the fact that communication device 130 may not be registered with the account provider service (e.g., communication device 130 may not be registered with any account provided by the account provider service). In one example, this may be accomplished by receiving identification and authentication information (e.g., a username and password) from the user. Such validation information may be sent from the user to the account service provider through a variety of communication channels other than a network-based interface (e.g., network-based interface 115). For instance, such validation information may be received via one or more text messages (in some cases, included within the original text message), a voice communication channel, or some other communication channel that does not include a network-based interface (e.g., network-based interface 115). In this example, once the user has been validated, the account provider service may perform the task requested by the user. In this case, such task may include, e.g., processing the purchase of the advertised item or notifying the account provider such that the account provider service may process the purchase of the advertised item.

Figure 2:
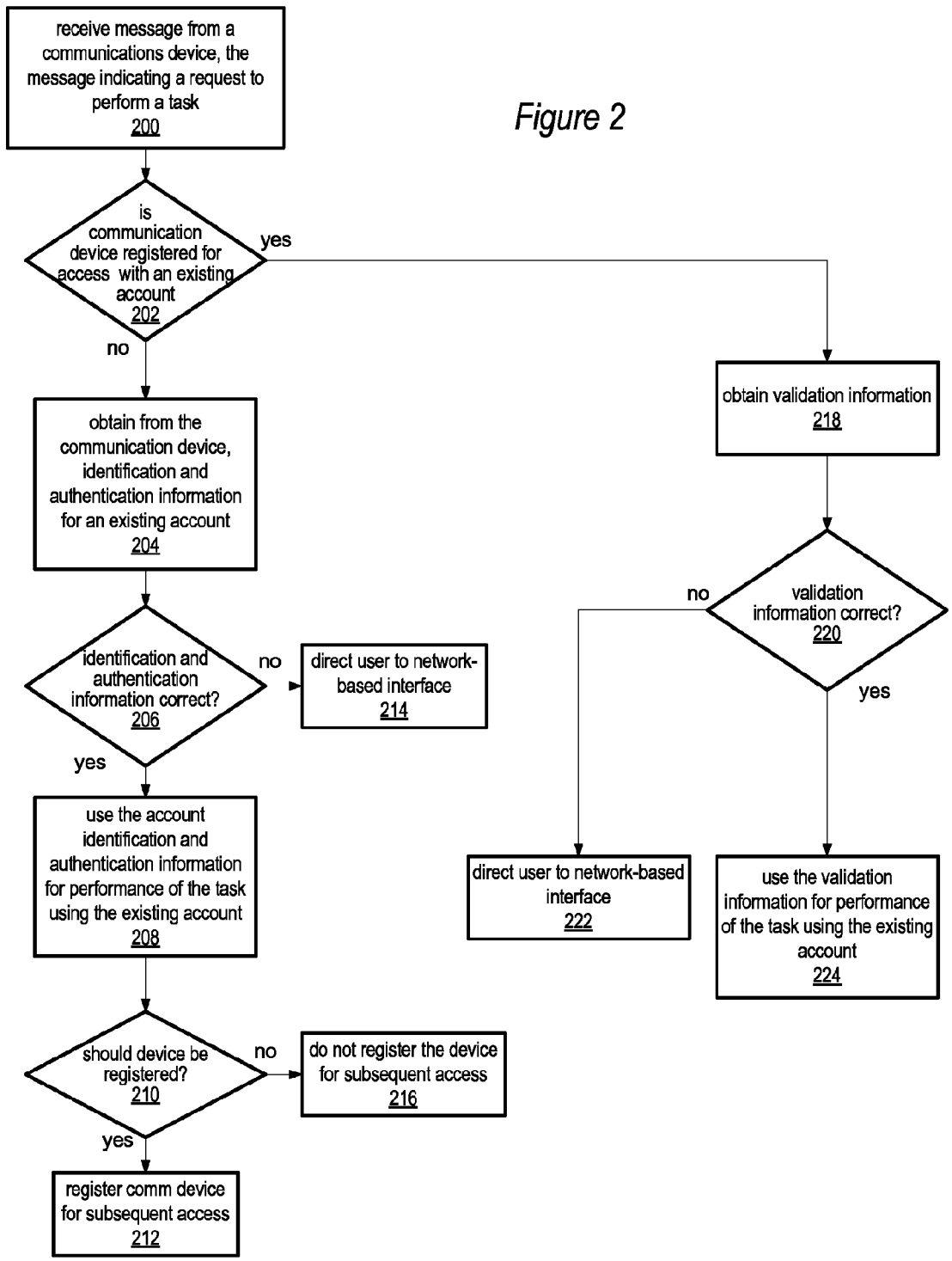
FIG. 2 illustrates a flowchart of a method for processing messages received from communication devices, according to various embodiments.

The system and method for receiving task requests from unregistered devices may include various methods. One such method is illustrated by the flowchart of FIG. 2 as well as the block diagram of FIG. 3. Note that the following description collectively refers to FIG. 2 and FIG. 3. Such method may in various embodiments be employed by the communication interface service described herein. As illustrated, the method may include receiving a message from a communication device (block 200). Such message may include a request to perform a task. For instance, such task may include but is not limited to purchasing an item, transferring funds to another entity, and/or managing services. Further, the method may in some cases include receiving such message via a communication channel other than a network-based interface, such as a text messaging or voice communication channel. However, the method may in other cases include receiving the message via a network-base interface such as network-based interface 115 described herein. For instance, in one embodiment, the communication device may be a mobile phone equipped with a web browser, and the message may be sent via the web browser to the network-based interface.

Figure 3:
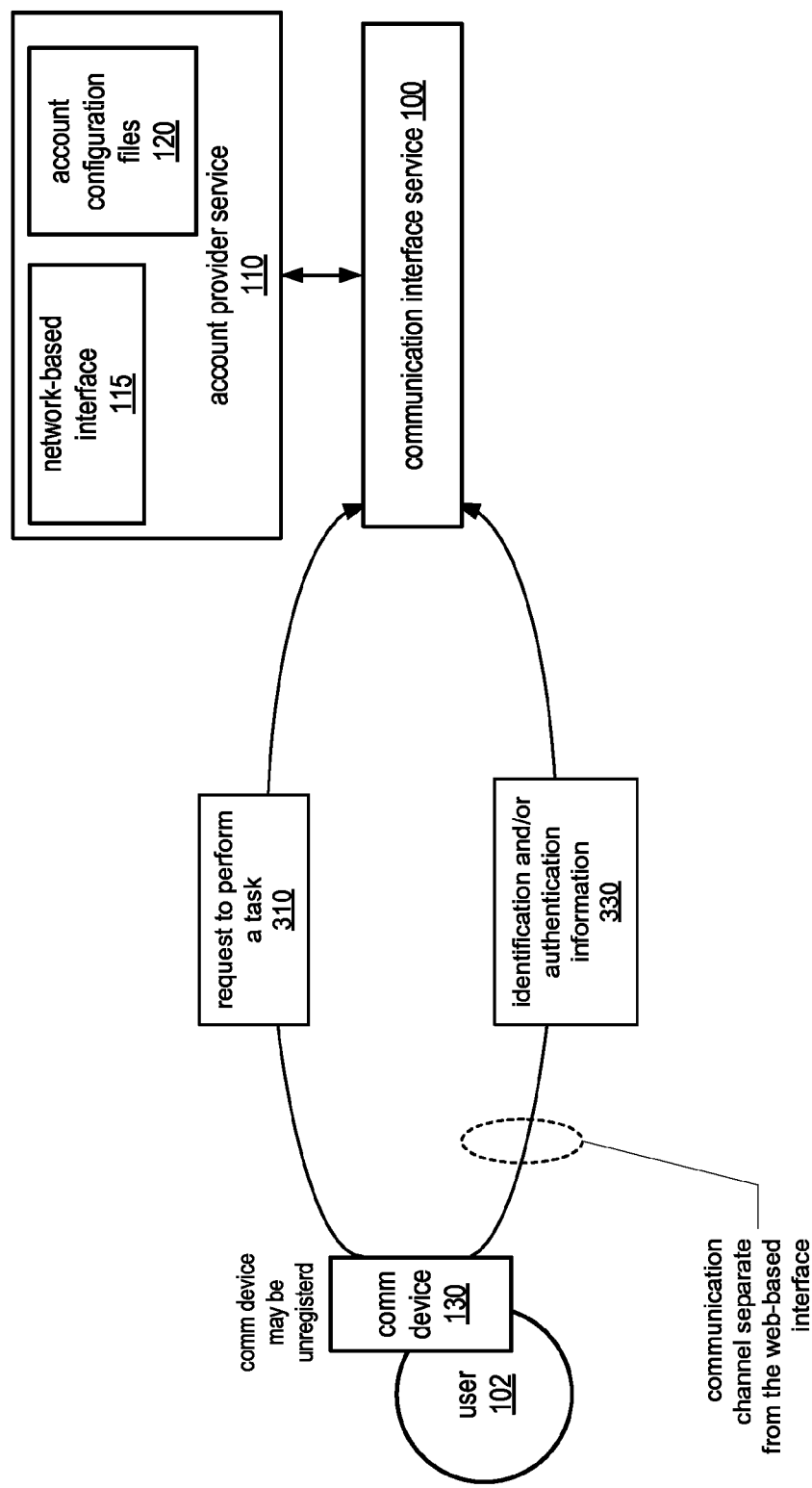
FIG. 3 illustrates a block diagram that illustrates the data flow between a communication device and an account provider service, according to various embodiments.

Message 310 of FIG. 3 illustrates the transfer of such a message from a communication device (e.g., communication device 130) to a communication interface service (e.g., communication interface service 100). In some embodiments, such message may include identification information as described above (e.g., username, email address, etc.). However, in some cases, such identification information may be collected with authentication information as described with respect to block 204 below.

The method may in some embodiments include determining whether the communication device is registered for access with an existing account, such as the various accounts provided by account provider service 110 (block 202). In various embodiments, this may include determining whether the communication device is registered to access (via the communication channel) a specific account provided by an account provider service (e.g., account provider service 110). For instance, in one embodiment, determining whether the communication device is registered for access may include searching for an identifier of the communication device among the various account configuration files provided by the account provider service to determine whether such files indicate that the particular device has been registered for access via one of the accounts provided by the account provider service. For example, in one embodiment, the received message may be a text message (e.g., an SMS text message) received via a text messaging communication channel. In this example, the method may include utilizing caller ID or some other identification technique to determine an identifier (e.g., a phone number) of the device that sent the text message. In various embodiments, other device identifiers may be utilized, such as International Mobile Equipment Identity (IMEI) numbers. In this example the method may include searching the account configuration files provided by the account provider service to determine whether any of the account configuration files indicate the particular communication device (e.g., as indicated by the device's identifier) is registered with a user account provided by the service.

If the communication device is not registered for access with any existing accounts provided by the account provider service (negative output of block 202), the method may include obtaining identification and authentication information for an existing account from the communication device (block 204). In some embodiments, obtaining such information may include contacting the user that sent the message to obtain identification and/or authentication information from the user. Such identification information may include information for verifying the identity of such user. For example, in one embodiment, the method may include asking the user for a username and password combination. In other embodiments, authentication information, such as passwords, pass codes, and other security related information, may be requested. In some embodiments, the information that is requested from the user may be the same identification and authentication information that the user may have previously used to access a network-based interface (e.g., network-based interface 115). In various embodiments, such network-based interface may be a network-based interface of an account provider service implementing the method described. For instance, as described above, account provider service 110 may in various embodiments be configured to perform the method illustrated by FIG. 2. Accordingly, in some embodiments, the identification and authentication information requested from the user may be the same identification and authentication information that the user may utilize to access network-based interface 115. In one particular embodiment, such identification and authentication information includes the user's email address and an account password.

In various embodiments, obtaining the identification and authentication information may include contacting the user for such information via the same communication channel through which the message is received in block 200. For instance, if the message were received via a text messaging communication channel, block 204 may include contacting the user for validation information via a text messaging communication channel. However, since different communication channels may be susceptible to different types of security threats in certain situations, contacting the user for validation information via a communication channel that is different than the communication channel through which the message is received at block 200 may in some cases provide a higher level of security for communications with the communication device. For instance, consider the case where the message is received at block 200 through a text messaging communication channel. If the text messaging communication channel were compromised by a fraudulent individual (e.g., such as a "man-in-the-middle" or other eavesdropper), the message received at block 200 might alert the fraudulent individual that sensitive information (e.g., identification and authentication information) is soon to follow. By obtaining the identification and authentication information via a communication channel that is different than the communication channel through which the message is received at block 200 (e.g., a voice communication channel), the method may avoid disclosing sensitive information to a fraudulent individual that has comprised the communication channel through which the message is received at block 200 thereby improving the level of security for communications with the communication device. In some embodiments, one or both of such communication channels may be specified by the user (e.g., as indicated by an account configuration file).

In various embodiments, the identification and authentication information requested may include information other than usernames and passwords. In some embodiments, such validation information may include previously used billing information. For instance, in some embodiments, the user may be required to provide information about payment methods or billing information previously used with an existing account (e.g., the users account with the account provider service). For example, in one embodiment, the user may be asked to provide the last 4 digits of a previously used credit card number and/or a zip code of a previously used billing or shipping address. Note that this combination of validation information is merely exemplary and other combinations of identification and authentication information are possible and contemplated. For example, in some embodiments, such identification and authentication information may include name and/or contact information. Such name and/or contact information may in some cases be name and/or contact information previously registered with account provider service 110 via network-based interface 115.

In various embodiments, obtaining identification and authentication information may include receiving such information from the communication device (e.g., sent by the user) and determining whether such identification and authentication information included in the response is correct (block 206). Also note that the identification and authentication information received from the user is illustrated as identification and authentication information 330 of FIG. 3. Determining whether the identification and authentication information included in the response is correct may include determining whether such identification and authentication information is correct with respect to stored identification and authentication information accessible to the communication interface service and/or account provider service. For instance, the method may include determining whether such identification and authentication information is correct with respect to information stored in one or more account configuration files, such as account configuration files 120. If the validation information is not correct (negative output of block 208), the method may include directing the user to a network-based interface, such as network-based interface 115 of account provider service 110. For instance, the method may include sending a message to the communication device (e.g., via a voice communication channel or text messaging communication channel); such message may indicate, e.g., "The validation information you submitted could not be verified. Please visit <web address> to complete this action" (where <web address> represents an address of a network-based interface accessible via the Internet, such as network-based interface 115).

If the identification and authentication information is correct (positive output of block 206), the method may include using the identification and authentication information for performance of the task using the account that corresponds to such identification and authentication information. For instance, the task may be performed by the communication interface service or, alternatively, the communication interface service may notify the account provider service of such task such that the account provider service may perform or complete the task. Note that the task may be performed even when the communication device that sent the original message has not been registered for account access with the any of the accounts provided by the account provider service. For example, in response to determining that the identification and authentication information is correct, the method may include the processing of various tasks including but not limited to the purchase of an item, the transfer of funds to another entity, or the management of various services. In general, any task requested in block 200 may be performed in response to determining that the received identification and authentication information is correct. Note that such task may be performed even though the communication device that sent the message in block 200 may not be registered with the account provider service (e.g., account provider service 110).

In various embodiments, the method may also include determining whether the communication device should be registered with a respective existing account for subsequent requests to perform a task (block 210). For instance, the method may include sending a message to the communication device; such message may ask the sender whether the communication device should be registered with an existing account for subsequent access (e.g., for subsequent messages requesting the performance of one or more tasks). Such message may be sent via any of the various communication channels (e.g., voice communication channel, text messaging communication channel, etc.) described above. The method may include receiving a response from the user and registering or not registering the device dependent on such response. The method may include determining the user's answer such the response. For instance, if the response indicates that the device should not be registered (negative output of block 210), the method may include choosing to not register the device (block 216) (e.g., not registering the device with an account of the account provider service).

If the response indicates that the device should be registered with an account for subsequent access (positive output of block 210), the method may include registering (or initiating the registration of) the communication device with a respective account for subsequent access (block 212). In one embodiment, registering the device for subsequent access may include recording an identifier of the device (e.g., a phone number or other identifier) within the user's respective account configuration file (e.g., a file of account configuration files 120). For instance, such account configuration file may include one or more fields for listing devices that have been registered for access for an existing account. Accordingly, upon subsequent requests for performance of a task (as described above with respect to blocks 200 and 202), the communication interface service may be configured to determine that the communication device is registered for account access. In some embodiments, registering the communication device may be specific to a particular communication channel. For instance, in one embodiment, the method may include registering the device for account access via text messaging but not for account access via other communication channels.

In various embodiments, registering the communication device for subsequent access may includes establishing validation information such as a personal identification number (PIN) (or other security or validation information) to be used on subsequent account function requests. For instance, the method may include contacting the user via a voice communication channel on the communication device. Furthermore, the method may include contacting the user via a voice communication channel with a synthesized voice message that states "please enter a PIN via your keypad for use with subsequent account accesses from this device." Other methods for obtaining a PIN or other security information from the user are possible and contemplated. Further description of such PIN or other security or validation information is presented below with respect blocks 218-224.

As described above with respect to block 202, the method may include determining whether the communication device (e.g., the communication device that sent the message indicating a request to perform a task) is registered for account access through which the original message (e.g., the message indicating a request to perform a task) was sent. In one example, the method may include obtaining an identifier of the communication device (e.g., via caller ID) and determining if such identifier has been recorded within the user's account configuration file (e.g., a file of account configuration files 120). In various embodiments, the method may include determining that the communication device is registered for access via the communication channel (positive output of block 202). For instance, in one embodiment, the method may include determining that the communication device identifier was previously recorded within the user's account configuration file.

In such case, the method may include obtaining validation information such as identification and authentication established in block 206 as described above. Obtain validation information may include sending a request for validation information to the communication device. In various embodiments, this request may be sent via any of the various communication channels described above. For instance, in one embodiment, such request may be sent via a text messaging communication channel. In other embodiments, such request may be sent via a voice communication channel or some other communication channel. In some embodiments, such request may be a request for the identification and authentication information described above with respect to block 204 and block 206. In various embodiments, such request may be a request for a PIN or other security or validation information registered with the account provider service, such as described above with respect to block 212. In this way, the PIN (or other validation information) set by the user during a previous access of the account provider service with the communication device may be used to validate the user. In some cases, this may make the validation process quicker and easier for the user. For instance, instead of sending an email address and a password to the communication interface service, the user could provide, e.g., a four digit numerical PIN. Note that such PIN is merely exemplary and other forms of validation information are possible and contemplated in various embodiments.

The method may further include receiving validation information from the user. As described above, this may in some case include receiving the identification and authentication information described with respect to blocks 202-204. However, in various embodiments, receiving the validation information may include receiving a PIN or other security or validation information as described above with respect to block 212. Receiving the validation information may also include receiving the validation information through a variety of communication channels including but not limited to a voice communication channel and/or a text messaging communication channel. In various embodiments, such validation information may be received via a communication channel other than a network-based interface (e.g., network-based interface 125). The method may further include determining whether such validation information is correct (block 220). In some embodiments, determining whether such validation information is correct may include determining whether such validation information is correct with respect to stored information accessible to the account provider service and/or the communication interface service. For instance, in one embodiment, determining whether such validation information is correct may include determining whether such validation is correct with respect to validation information stored within the user's respective account configuration file. In some embodiments, the validation information of the user's account configuration file may have been previously provided by the user or previously registered by the user via a network-based interface (e.g., network-based interface 115). For instance, such validation information may have been provided during an account registration process.

If the validation information is not correct (negative output of block 220), the method may include directing the user to the network based interface (as described with respect to block 214). Note that in some embodiments, the user may be provided with multiple chances to provide such validation information. For instance, if the user mistakenly enters the wrong validation information, they may be given a set number of additional attempts to provide the correct validation information. However, if the validation information is correct (positive output of block 228), the method may include performing the task requested by the receive message or, alternatively, notifying the account provider service such that the account provider service may initiate and/or complete the performance of the task. For instance, depending on the particular task requested, performing the task might include various actions including but not limited to processing a purchase for one or more items, managing features of a subscription account, or transferring funds to one or more entities.

Figure 4:
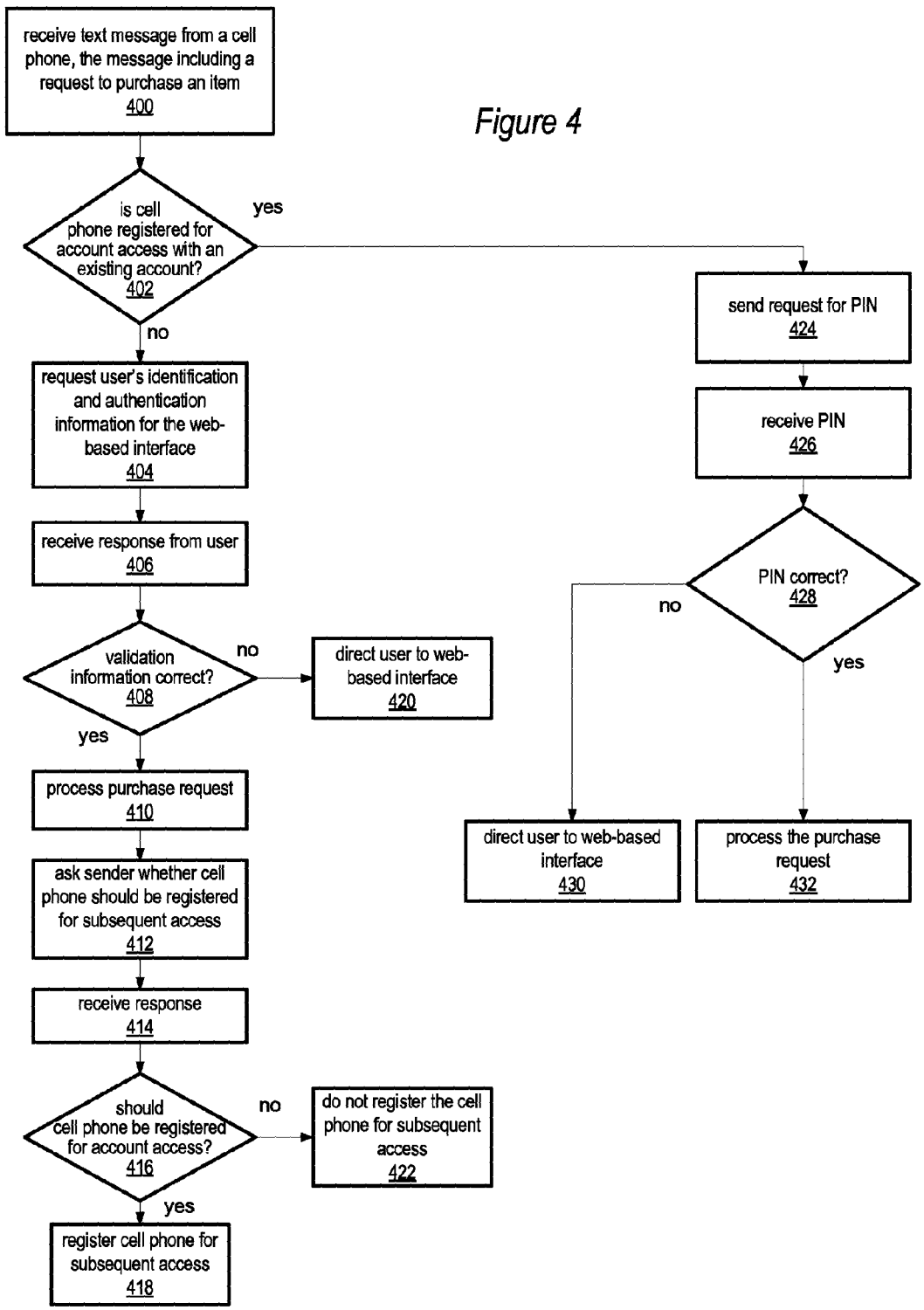
FIG. 4 illustrates a flowchart of a method for processing text messages received from a cell phone, according to various embodiments.

FIG. 4 illustrates one particular embodiment of a method that may be implemented by the communication interface described herein. Note that the following description collectively refers to FIG. 4 and FIG. 5. Further, with respect to FIG. 5, note that cell phone 530 is a particular instance of communication device 130 described above, merchant service 510 is a particular instance of account provider service 110 described above, web-based interface 515 is a particular instance of network-based interface 115 described above, and customer account configuration files 520 are particular instances of account configuration files 120 described above, according to various embodiments.

Merchant service 510 may be a service configured to enable users to browse an electronic catalogue of items (e.g., books, music, movies, electronics, other items, services, etc.). For instance the merchant service may provide one or more product web pages via web-based interface 515. For example, merchant service 510 may be implemented by one or more web servers configured to service requests from client computer systems for such product web pages. The merchant service may also be configured to sell the items of its electronic catalogue to users that have registered for an account with the merchant service. For instance, the merchant service may be configured to receive via web-based interface 515 an indication of one or more items a user desires to purchase as well as other information for processing an order for such items. Such other information may include, e.g., billing information (e.g., credit card numbers, bank account and routing numbers, etc.) and shipping information (e.g., shipping method, shipping carrier, etc.). In various embodiments, this information may have been previously registered via web-based interface 515 and stored in a customer account configuration file of customer account configuration files 520. Customer account configuration information may also include information similar to or the same as the information described above with respect to account configuration files 120 (e.g., identification and authentication information, account preferences, shipping preferences, etc.).

Cell phone 530 may be a cellular or mobile telephone configured to communicate wirelessly via one or more of the various cellular technologies described above (e.g., GSM, CDMA, TDMA, etc.). Note that cell phone 530 may in various embodiments be a smart phone, PDA, or some other mobile device. In general, cell phone 530 may be any device configured to communicate via a text messaging communication channel and/or a voice communication channel.

Figure 5:
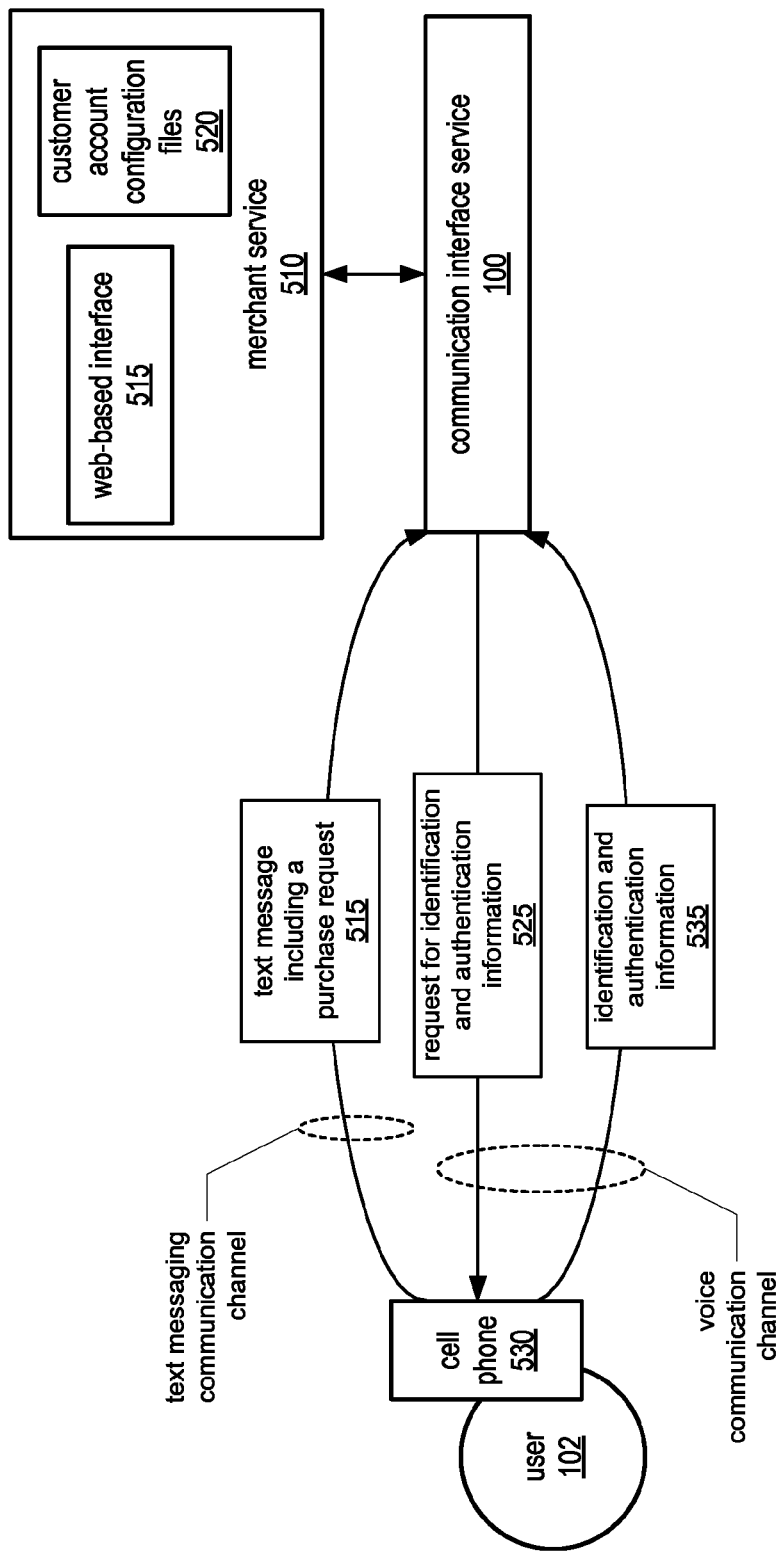
FIG. 5 illustrates a block diagram that illustrates the data flow between a cell phone and a merchant service, according to various embodiments.

The method of FIG. 4 may include receiving a text message from a cell phone (400). The receipt of such text message is illustrated by text message 515 of FIG. 5. The text message may include a request to perform a task. In this embodiment, such task may include the processing of a purchase request. For example, in one embodiment, an exemplary text message might include a promotional code for ordering an item. Such codes may be viewed within advertisements or sales listings. For instance, user 102 could view a roadside billboard for an item. Such billboard might include an image of an item for sale as well as the following exemplary message: "To purchase this item, text PROMO55 to 43032" (where PROMO55 is an exemplary promotional code and 43032 is an exemplary text messaging identifier for a merchant). As illustrated in FIG. 5, the text message of this embodiment is received through a text messaging communication channel. Note that the cell phone from which the text message is sent may in various embodiments be unregistered with respect to the various accounts provided by the merchant service. For example, in one embodiment, customer account configuration files may include one or more data fields for recording identifiers (e.g., phone numbers or other identifiers) of devices associated with various account holders. If no devices have been registered for a particular user's account, such data fields may be empty.

The method may further include determining whether the cell phone is registered for account access with any of the accounts provided by merchant service 510 (block 402). As described above, customer account configuration files may include one or more data fields that are configured to store identifiers of devices that have been registered with the merchant service. Accordingly, determining whether the cell phone is registered to access the merchant service via text messaging may include searching the various customer account configuration file (e.g., items 520) for a device identifier of the cell phone to determine whether an of such customer account configuration files include a record for the cell phone. For instance, in one embodiment, the method may include determining an identifier for the cell phone (e.g., via caller ID) and checking such customer account configuration files for such identifier. If the identifier is present within a customer account configuration file, the method may include determining that the cell phone has been registered with the respective account provided by the merchant service. If the identifier is not present within any of the customer account configuration files, the method may include determining that the cell phone has not been registered with any of the accounts provided by the merchant service. In other embodiments, other techniques may be employed to determine whether the cell phone has been registered with the merchant service.

If the cell phone is not registered with the merchant service (negative output of block 402), the method may include requesting the user's identification and authentication information for the network-based interface (e.g., network-based interface 115) (block 404). For instance, such identification and authentication information might include an email address and password that the user has previously used to access the merchant service (e.g., merchant service 510) via the merchant's web-based interface (e.g., web-based interface 515). For instance, such validation information might be the login information that the user uses to access a website of the merchant service provided by the web-based interface. In other embodiments, other types of identification and authentication information may be requested. The request for validation information is illustrated as request 525. Note that in this particular embodiment such request is sent via a voice communication channel; in other embodiments the request may be sent via other communication channels. For instance, the communication interface service described herein may request such identification and authentication information from the user via an automated voice system configured to interact with one or more users via synthesized voices. Such automated voice system may be configured to contact the user via an automated phone call and present a voice message to the user. For instance, such voice message might include a message such as "please enter the email address and password for your customer account via your phone keypad."

The method may further include receiving a response that includes identification and authentication information from the user (block 406). An example of this response is illustrated as item 535 of FIG. 5. In general, the identification and authentication information provided by the user may correspond to the particular identification and authentication information requested. For instance, if an email address and password were requested, the identification and authentication information received may in many cases include an email address and a password. In other embodiments, other types of identification and authentication information (such as the various types of identification and authentication information described above) may be received. As illustrated by FIG. 5, the user's response may in various embodiments be sent from the cell phone via a voice communication channel. In some cases, such response may be provided during a communication session with the automated voice system described above. For instance, the automated voice system might prompt the user for validation information and the user could provide the automated voice system with such validation information during a same session (e.g., same phone call). Note that the voice communication channel described and illustrated does not include web-based interface 515. While the identification and authentication information is obtained via a voice communication channel in this embodiment, in general, any communication channel that does not include web-based interface 515 may be employed in the illustrated embodiment.

The method may further include determining if such identification and authentication information is correct (block 408), which may include determining whether the identification and authentication information is correct with respect to stored identification and authentication information accessible to the merchant service. For instance, such stored validation information may include identification and authentication information that the user registered with the merchant service via web-based interface 515 (e.g., during an account registration process). If the identification and authentication information is not correct, the user may be directed to access the merchant service via the service's web-based interface (block 420).

If it is determined that the user has provided the correct identification and authentication information (positive output of block 408), the method may include processing the purchase request (block 410). For instance, the method may include debiting an account (e.g., a credit card account) on file with the merchant service for an amount of the purchase price for the order. The method may also include initiating the fulfillment of such items. Such fulfillment may include packaging and shipping such items to the user. In various embodiments, processing the purchase request may include utilizing information previously registered via the merchant service's network-based interface. For instance, a credit card registered via the network-based interface may be billed. In another example, a previously used shipping address may be designated as the shipping address of the items purchased.

In various embodiments, block 410 may include notifying merchant service 510 such that the merchant service may perform the requested task (e.g., processing the purchase of one or more items). For instance, the method may include conveying information to the merchant service including but not limited to information indicative of a customer's name (or other customer or account identifier) and one or more items to be purchased. In this case, merchant service 510 may complete the performance of the task requested by the original text message (e.g., the text message described above with respect to block 400).

The method may also include registering the cell phone with an existing account provided by merchant service 510 for subsequent account access. For instance, the method may include asking the sender whether the cell phone should be registered for subsequent account access (block 412). In some embodiments, this may occur via an automated voice system. For instance, receiving the user's response (block 414) may include receiving the user's response through an automated voice system, such as the automated voice system used to collect the user's identification and authentication information in block 406 described above. In some cases, receiving identification and authentication information as described with respect to block 406 and receiving the user's response (block 414) may occur during the same phone session (e.g., same phone call) with such an automated phone system. The method may further include determining whether the cell phone should be registered for access with an account provided by the merchant service based on the user's response (block 416). If the cell phone should be registered (positive output of block 416), the method may include registering the cell phone for subsequent access via any of the various methods described above (block 418). As described above, this may include creating a record of the cell phone within a customer configuration file associated with an existing account. Furthermore, registering the cell phone for subsequent access may in various embodiments include establishing a PIN for subsequent account access. Accordingly, upon receiving subsequent text messages including purchase requests (e.g., blocks 400-402) the method may include evaluating such PIN (provided by the user) and processing the purchase request if the PIN is correct (blocks 424-432) using any of the various techniques for processing purchase requests as described above. Note that if the PIN provided is incorrect, the method may include directing the user to the web-based interface for further assistance (block 430). Also note that, as is the case with the validation information described above with respect to FIG. 2, use of a PIN may be quicker and more convenient for the user. For instance, a four digit PIN may be easier to type (when compared to a longer alphanumeric password, for example) on a cell phone that does not have a full QWERTY keyboard.

The block diagrams of FIGS. 6A-6D illustrate exemplary configurations of systems including a communication interface service, according to some embodiments. In each of FIGS. 6A-6D, network 610 may be a variety of networks include but not limited to Local Area Networks (LANs), Wide Area Networks (WANs), telecommunication networks (e.g., mobile voice and data networks), some other type of network, or some combination thereof. In general, network 610 may be configured to support communication via any of the various communication channels described herein.

As illustrated by FIG. 6A, the communication interface service may in various embodiments be configured as a component of an account provider service (e.g., account provider service 110), according to some embodiments. For instance, in various embodiments account provider service 110 may be an application executing on a host system, such as host system 620. In this example, communication interface service 100 may be an application extension or another item configured to extend the functionality of account provider service 110. For instance, communication interface service 100 may enable the account provider service to process requests for account functions, such as the text messages described herein. Additionally, user 102 may communicate with communication interface service 100 (and/or account provider service 110) via various communication devices, such as communication device 130. Communication device 130 may include various devices including but not limited to cellular or mobile telephones (or other devices configured to communicate via voice or text message communications), devices configured to communication via email, conventional land-based telephones, and/or devices configured to communicate via any of the various communication channels described herein. Additionally, data store 650 may be a back-end database or other system configured to store account configuration files 120.

Figure 6C:
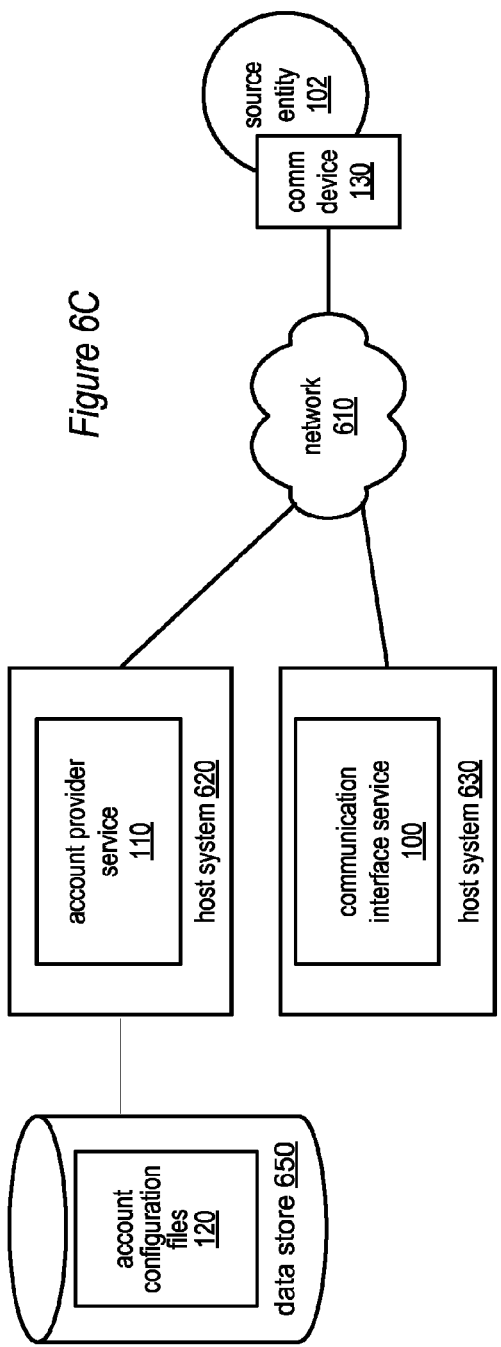
Figure 6D:
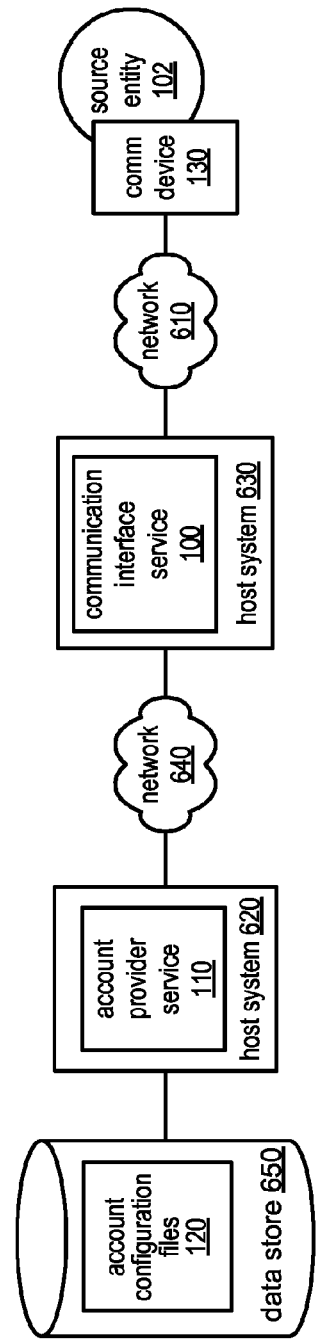

In other embodiments, such as the illustrated embodiment of FIG. 6B, communication interface service 100 may be implemented as an application separate from the account provider service yet residing on the same host system 620. For instance, communication interface service may be an application configured to service requests from account provider service 110. Note the other elements of FIG. 6B may operate in a manner similar to (or the same as) the respective, like-numbered elements of FIG. 6A. In other embodiments, communication interface service 100 may be configured to be executed on a computer system (e.g., host system 630) separate from the computer system on which the account provider service 110 executes, such as illustrated by the block diagram of FIG. 6C. For instance, in the illustrated embodiment, communication interface service 100 may be a web service configured to service requests from account provider service 110. As illustrated by FIG. 6D, account provider service 110 may communicate with communication interface service 100 via network 640, which may in various embodiment be a network separate from network 610. For instance, in one embodiment, network 610 may be a wireless communications network configured to transport text messages sent to and/or from communication device 130. In contrast, network 640 may be a WAN, such as the Internet, in this example.

Disambiguating Identification and Authentication Information

As described above, the communication interface service and/or the account provider service described herein may be configured to receive identification and authentication information from a user. For instance, such identification and authentication information may be used to determine whether the user of a device has an account established with an account provider service. As described above, this identification and authentication information may in various embodiments be received via a variety of communication channels including text messaging and voice communication channels. In some cases, such as when a user provides such information via a voice communication channel, the user may need to utilize an input device with limited input functionality. For instance, the user may need to enter identification and authentication information that includes alphabetical characters. However, the input device may not include keys (or other input elements) for alphabetical characters. For example, the user may need to enter identification and authentication information that includes alphabetical characters via a numeric keypad, such as a numeric keypad typically found on cell phones and other mobile devices. Accordingly, the communication interface service described herein may be configured to enable a user to provide alphanumeric information via an input device that do does not include dedicated input elements (e.g., keys, buttons, etc.) for alphabetical characters.

For example, in one embodiment, the identification and authentication information to be provided by the user includes an email address (e.g., jsmith@abc.com) and an associated password (e.g., PASS1234). The communication interface service described herein may enable the user to enter such information using only a standard numeric keyboard found on many cell phones and other mobile devices. Note that the techniques described herein may also apply to other types of input devices that do not include a full QWERTY input. In some embodiments, the communication interface service may be configured to enable a user to submit their identification and authentication information (e.g., username and password) using the standard letter-to-key mappings found on many cell phones and other mobile devices. For instance, in one embodiment, the number 2 may map to ABC, 3 to DEF, 4 to GHI, 5 to JKL, 6 to MNO, 7 to PQRS, 8 to TUV, and 9 to WXYZ. The asterisk (*) may be used for all punctuation, and numbers may remain unmapped. Note that the techniques described herein are not limited to these exemplary key mappings. Indeed, in other embodiments, other key mappings are possible and contemplated. In this example, the user could enter his/her email address (e.g., jsmith@abc.com) by submitting the following: 576484*222*266. The user could enter his/her password (e.g., PASS1234) by submitting the following: 72771234.

In various embodiments, the account provider service may generate an index of user identification and authentication information and corresponding mapped versions of such information. This index may be used to determine whether the mapped identification and authentication information provided by a user is correct. However, note that in some cases, the mapped identification and authentication information of one user may be the same as the mapped identification and authentication information of another user even if the identification and authentication information itself is not the same. For instance, the email address ksmith@abc.com would also map to 576484*222*266. Likewise, the password PASS12DH would also map to 72771234. In many cases, the combination of an email address (or other user identifier) and a password (or other security information) may be unique. However, in cases where such combination is not unique, the communication interface service may be configured to ask the user for additional information to differentiate such user from other users having the same mapped identification and authentication information. For instance, the communication interface service may ask the user to enter a mother's maiden name, social security number, credit card number, etc. until the user can be uniquely identified. If for some reason the user cannot be uniquely identified, the communication interface service may direct the user to the network-based interface of the account provider service for resolution of the issue.

Illustrative System

Various embodiments of a system and method for receiving task requests from unregistered devices, as described herein, may be executed on one or more computer systems, which may interact with various other devices. One such computer system is computer system 700 illustrated by FIG. 7. Computer system 700 may be capable of implementing a communication interface service and/or an account provider service, such as communication interface service 100 and/or account provider service 110. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a communication interface service and/or an account provider service, such as communication interface service 100 and account provider service 110 described above, are shown stored within system memory 720. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other systems (e.g., communication device 130), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
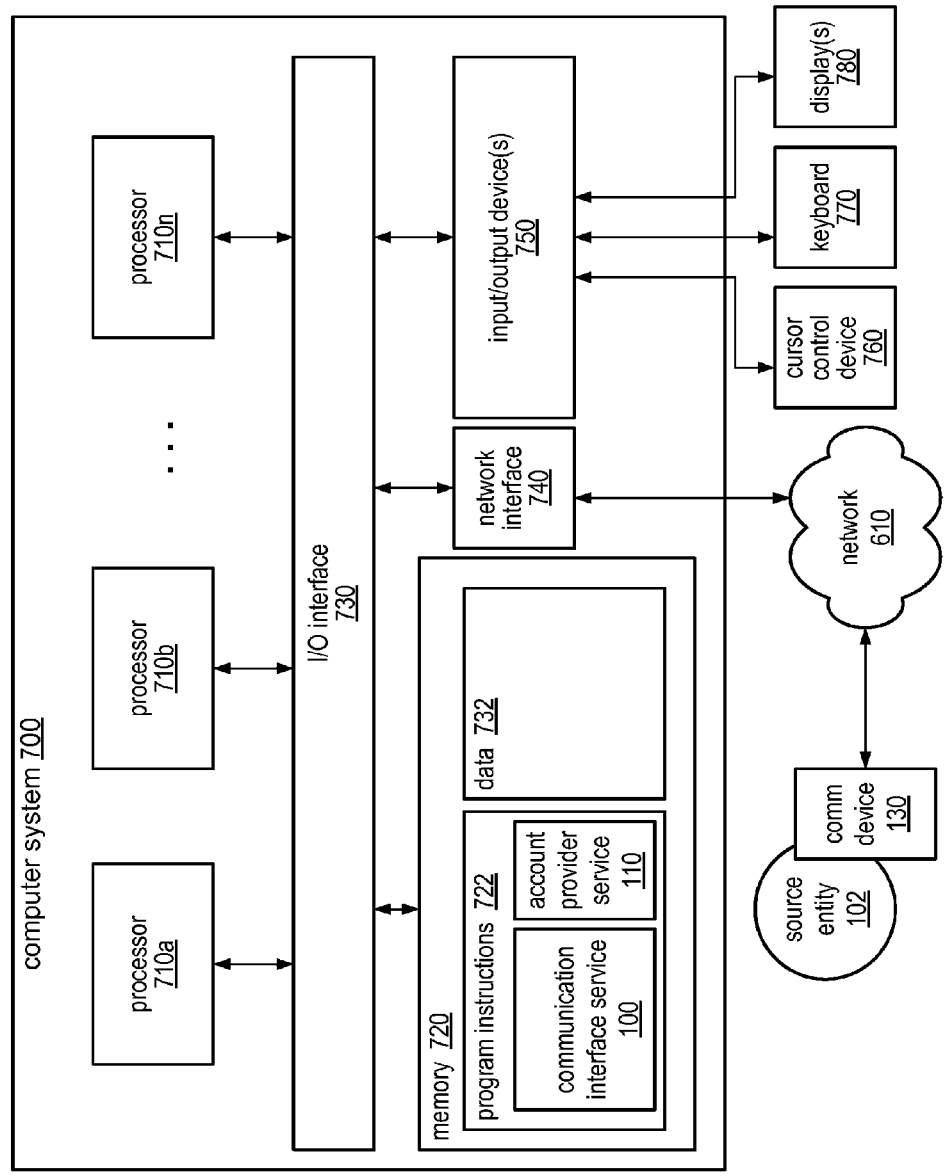
FIG. 7 illustrates a block diagram of a system suitable for implementing various systems and components of the system and method for receiving task requests from unregistered devices, according to various embodiments.

As shown in FIG. 7, memory 720 may include program instructions 722 configured to implement communication interface service 100 and/or account provider service 110. In one embodiment, accessibility component 100 and/or account provider service 110 may implement the methods described above, such as the methods illustrated by FIG. 2 and FIG. 4. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the actions of the methods may be changed, and various elements may be added, reordered, combined, omitted, modified, etc. Various modifications and changes may be made as would be obvious to a person skilled in the art having the benefit of this disclosure.

These various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
a memory;
one or more processors coupled to said memory; wherein said memory comprises program instructions executable by the processor to implement a communication interface service configured to:
receive a message from a communication device, the message indicating a request to purchase an item;
determine that said communication device is not registered with an existing account that includes billing information previously submitted by a user for performing purchases;
obtain from the unregistered communication device via a communication channel, identification and authentication information for the existing account that includes the previously-submitted billing information; wherein said existing account is accessible through a network-based interface; wherein said communication channel does not include said network-based interface; and
validate the identification and authentication information received from the unregistered communication device through said communication channel as being correct relative to identification and authentication information previously-submitted by said user through the network-based interface, and
in response to that validation:
complete the purchase of the item with the previously-submitted billing information of the existing account.

2. The system of claim 1, wherein the communication interface service is configured to:
receive an indication that the device is to be registered with the existing account; and
in response to said indication, initiate registration of the device with the existing account.

3. The system of claim 1, wherein said obtained identification and authentication information comprises identification and authentication information for accessing said existing account via the network-based interface.

4. The system of claim 3, wherein said identification and authentication information for accessing said existing account via the network-based interface comprises a username and a password.

5. The system of claim 4, wherein said username comprises one or more of: an email address, a user-selected alias, or an alias assigned by the communication interface service.

6. The system of claim 1, wherein said communication channel is a voice communication channel or a text messaging communication channel.

7. The system of claim 1, wherein the communication interface service is configured to provide an account provider of said existing account an indication of the request to purchase an item.

8. The system of claim 1, wherein said request indicates a request to transfer funds to an entity, wherein the communication interface service is configured to provide an account provider of said existing account an indication of the request to transfer funds to the entity.

9. The system of claim 1, wherein said message is a text message.

10. The system of claim 9, wherein said text message adheres to the Short Message Service (SMS) protocol.

11. The system of claim 1, wherein said message is an electronic mail message.

12. The system of claim 1, wherein to determine that said communication device is not registered the communication interface service is configured to access mapping information and determine that said mapping information does not contain a record of the communication device.

13. The system of claim 1, wherein to determine that said communication device is not registered the communication interface service is configured to access a plurality of account configuration files and determine that said account configuration files do not contain a record of the communication device.

14. The system of claim 13, wherein the communication interface service is configured to determine an identifier of the communication device through caller ID, wherein to determine that said plurality of account configuration files do not contain a record of the communication device the communication interface service is configured to determine that said plurality of account configuration files do not contain said identifier.

15. The system of claim 1, wherein the communication interface service is configured to access information previously registered via the network-based interface and use the accessed information for purchase of the item, wherein said information previously registered via the network-based interface comprises one or more of: customer contact information, or shipping preferences.

16. The system of claim 1, wherein said communication device is one or more of: a mobile device configured to communicate via text messaging, a mobile device configured to communicate via a voice communication channel, and a cellular telephone.

17. A computer-implemented method, comprising:
performing, by one or more computers:
receiving a message from a communication device, the message indicating a request to purchase an item;
determining that said communication device is not registered with an existing account that includes billing information previously submitted by a user for performing purchases;
obtaining from the unregistered communication device via a communication channel, identification and authentication information for the existing account that includes the previously-stored billing information; wherein said existing account is accessible through a network-based interface; wherein said communication channel does not include said network-based interface;
validating the identification and authentication information from the unregistered communication device as being correct relative to identification and authentication information previously-submitted by said user through the network-based interface, and in response to that validation:
complete the purchase of the item with the previously-submitted billing information of the existing account; and
register the communication device for subsequent access to the existing account through the communication channel with new authentication information.

18. The method of claim 17, wherein the method comprises providing an account provider of said existing account an indication of the request to purchase an item.

19. The method of claim 17, wherein said request indicates a request to transfer funds to an entity, wherein the method comprises providing an account provider of said existing account an indication of the request to transfer funds to the entity.

20. The method of claim 17, wherein determining that said communication device is not registered comprises accessing mapping information and determining that said mapping information does not contain a record of the communication device.

21. The method of claim 17, wherein determining that said communication device is not registered comprises accessing a plurality of account configuration files and determining that said account configuration files do not contain a record of the communication device.

22. The method of claim 21, further comprising determining an identifier of the communication device through caller ID, wherein determining that said plurality of account configuration files do not contain a record of the communication device comprises determining that said plurality of account configuration files do not contain said identifier.

23. The method of claim 17, wherein the method comprises accessing information previously registered via the network-based interface and using the accessed information for purchase of the item, wherein said information previously registered via the network-based interface comprises one or more of: customer contact information, or shipping preferences.

24. A non-transitory computer-readable storage medium storing program instructions computer-executable to implement a communication interface service configured to:
receive a message from a communication device, the message indicating a request to purchase an item;
determine that said communication device is not registered with an existing account that includes billing information previously submitted by a user for performing purchases;
obtain from the unregistered communication device via a communication channel, identification and authentication information for the existing account that includes the previously-stored billing information; wherein said existing account is accessible through a network-based interface; wherein said communication channel does not include said network-based interface; and
validate the identification and authentication information from the unregistered communication device as being correct relative to identification and authentication information previously-submitted by said user through the network-based interface, and in response to that validation:
complete the purchase of the item with the previously-submitted billing information of the existing account.

25. The medium of claim 24, wherein the communication interface service is configured to:
receive an indication that the device is to be registered with the existing account; and
in response to said indication, initiate registration of the device with the existing account.

26. The medium of claim 24, wherein the communication interface service is configured to provide an account provider of said existing account an indication of the request to purchase an item.

27. The medium of claim 24, wherein said request indicates a request to transfer funds to an entity, wherein the communication interface service is configured to provide an account provider of said existing account an indication of the request to transfer funds to the entity.

28. The medium of claim 24, wherein to determine that said communication device is not registered the communication interface service is configured to access mapping information and determine that said mapping information does not contain a record of the communication device.

29. The medium of claim 24, wherein to determine that said communication device is not registered the communication interface service is configured to access a plurality of account configuration files and determine that said account configuration files do not contain a record of the communication device.

30. The medium of claim 29, wherein the communication interface service is configured to determine an identifier of the communication device through caller ID, wherein to determine that said plurality of account configuration files do not contain a record of the communication device the communication interface service is configured to determine that said plurality of account configuration files do not contain said identifier.

31. The medium of claim 24, wherein the communication interface service is configured to access information previously registered via the network-based interface and use the accessed information for purchase of the item, wherein said information previously registered via the network-based interface comprises one or more of: customer contact information, or shipping preferences.

* * * * *